United States Patent [19]

Moeller et al.

[11] Patent Number: 4,863,114
[45] Date of Patent: Sep. 5, 1989

[54] MAGNETIC TAPE CARTRIDGE IDENTIFICATION

[75] Inventors: Gary D. Moeller; Steven R. Seeman; Theodore A. Schwarz, all of St. Paul, Minn.

[73] Assignee: Minnesota Mining and Manufacturing Company, St. Paul, Minn.

[21] Appl. No.: 208,367

[22] Filed: Jun. 17, 1988

[51] Int. Cl.⁴ .............................................. G11B 23/30
[52] U.S. Cl. .................................. 242/188; 360/74.6; 242/199
[58] Field of Search ...................... 242/188, 199, 198; 360/74.6, 132; 250/561, 571

[56] References Cited

U.S. PATENT DOCUMENTS 2,994,072 7/1961 Woody, Jr. ...................... 360/74.6
3,861,619 1/1975 Wolff ............................... 242/188

Primary Examiner—David Werner
Attorney, Agent, or Firm—Donald M. Sell; David W. Anderson

[57] ABSTRACT

A data cartridge includes a length of magnetic tape which is formed at each end with a first pattern of holes to enable identification of the end of the tape and a second pattern of holes located within the first pattern of holes and configured to provide a binary code to enable automatic identification of the cartridge type or tape type. The first pattern of holes is different at each end of the tape to further enable the automatic differentiation of one end of the tape from the other end.

3 Claims, 2 Drawing Sheets

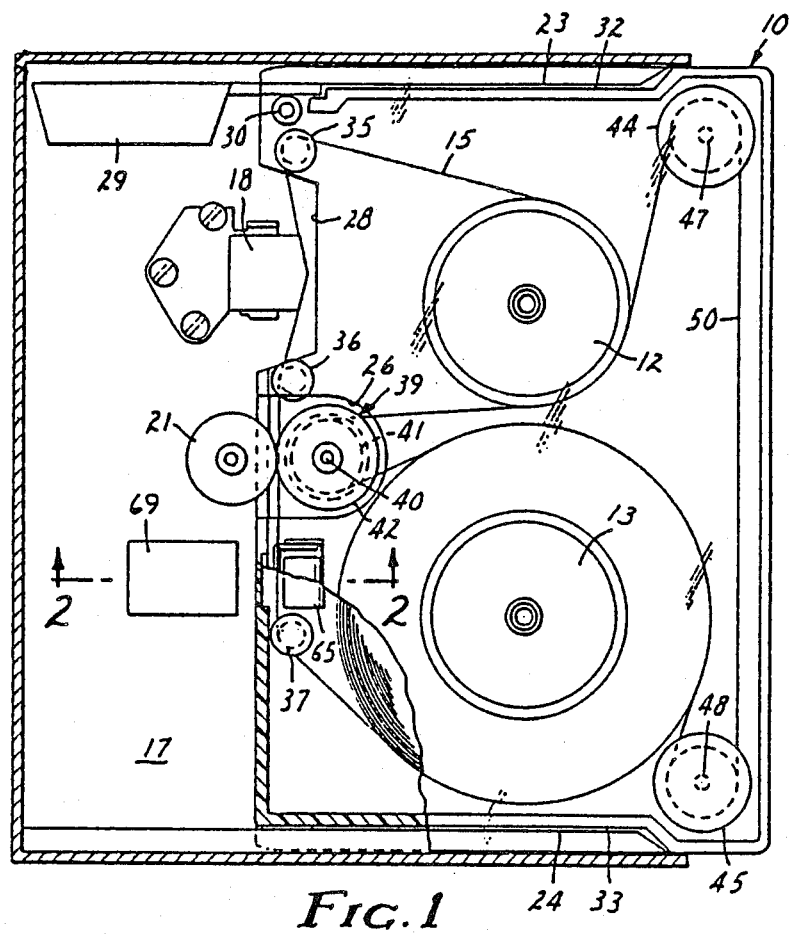
FIG. 1
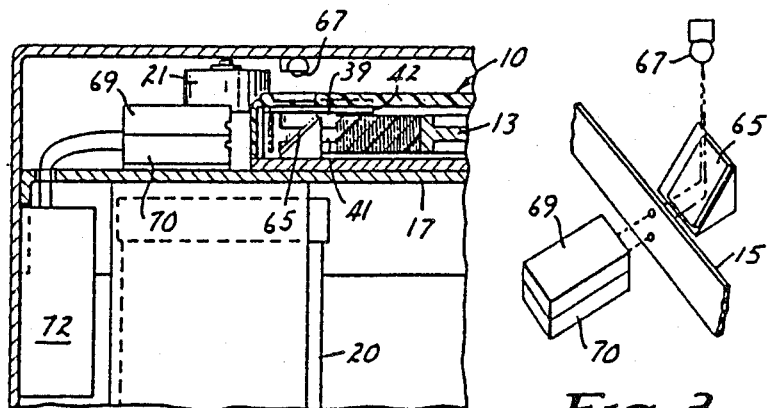
FIG. 2
FIG. 3

MAGNETIC TAPE CARTRIDGE IDENTIFICATION

FIELD OF THE INVENTION

The present invention relates to a magnetic tape cartridge in which the magnetic tape contained therein includes patterns of coding holes from which tape recorder functions may be automatically controlled.

BACKGROUND OF THE INVENTION

U.S. Pat. No. 3,861,619, assigned to the assignee of the present invention, recognized the desirability of automatic detection of the ends of the length of magnetic tape within reel-to-reel tape cartridges. That patent provided a length of magnetic tape which was formed adjacent each end with a repetitive pattern of holes, the patterns of holes at the two ends of the tape being different to distinguish the ends of the tape from each other. Two additional sets of holes, located more centrally of the length of tape, were also provided to demark the ends the desired recording area of the length of recording tape.

This system worked well and was adequate when there existed only a limited variety of cartridge types and the length of tape and useful recording area was the only information necessary to successfully utilize the cartridges. Since that time, however, there has been a proliferation of cartridge types wherein the cartridges vary not only in tape length but also in such things as tape width and coercivity of the tape itself.

In order to utilize the present variety of cartridge types, the tape recorder must be able to sense numerous factors in addition to merely tape length.

SUMMARY OF THE INVENTION

According to the present invention, the tape recorder is provided with necessary information relating to the cartridge type or tape type by providing according to the present invention a magnetic tape cartridge which includes a cartridge shell defining an enclosure, a pair of reel hubs supported within the enclosure, and a length of magnetic tape extending along a tape path within the enclosure and having its ends wound one on each of the reel hubs, with the length of tape being formed at each end with a first pattern of holes to enable automatic identification of the end of the tape and a second pattern of holes located within the first pattern of holes and configured to provide a code to enable automatic identification of such things as the cartridge type or tape type. Like the magnetic tape provided in U.S. Pat. No. 3,861,619 described above, the first pattern of holes is different at each end of the tape to enable the automatic differentiation of one of the ends of the tape from the other. The unique feature of the present invention is the second pattern of holes located within the first pattern of holes which provides a binary code in which "1"s and "0"s are indicated by the presence or absence of holes within the second pattern. This binary coding allows the magnetic tape to provide a virtually unlimited amount of identification data to the tape recorder and thereby allows the tape recorder to automatically adjust to the peculiarities of the tape cartridge and the magnetic tape contained therein.

The coding pattern located within the end-of-tape pattern may consist of a pattern which is unique from that of the end-of-tape pattern or it may be identical. In either case, the coding pattern is differentiated from the end-of-tape pattern by the spacing between the holes which define each pattern.

It is preferred in the present invention that all holes of all patterns be formed in the shape of an ellipse with its major axis aligned perpendicular to the length of the tape. This shape compensates for stretch of the tape by deforming to a desirable circular shape when the tape is in use.

BRIEF DESCRIPTION OF THE DRAWINGS

The present invention will be described with reference to the accompanying drawings, wherein like numbers refer to like parts in the several views, and wherein:

FIG. 1 is a plan view of a magnetic tape cartridge constructed in accordance with the present invention, partially in section and in position on a recording and/or reproducing machine;

FIG. 2 is a cross-sectional view taken generally along the line 2—2 of FIG. 1;

FIG. 3 is a perspective view illustrating a portion of the recording and/or reproducing machine shown in FIG. 2;

DESCRIPTION OF THE PREFERRED EMBODIMENT

Figure 4:
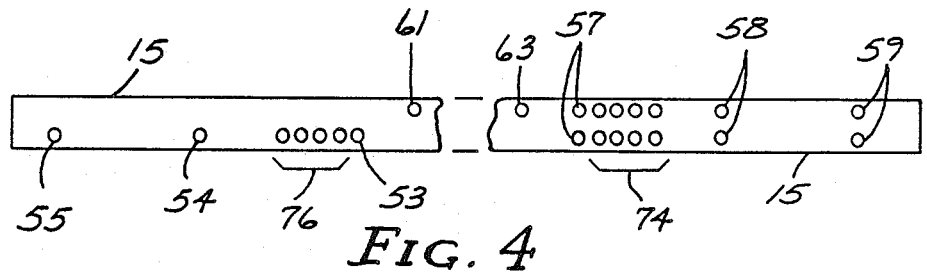
FIG. 4 is an elevational view of a first embodiment of a length of magnetic tape which may be contained within the cartridge of FIG. 1.

The magnetic tape cartridge of the present invention comprises a cartridge shell 10 defining an enclosure, a pair of reel hubs 12 and 13 supported within the enclosure for free rotation about spaced parallel axes and a length of magnetic tape 15 extending along a tape path within the enclosure and having its ends wound on each of the reel hubs 12 and 13.

In FIGS. 1 and 2 the cartridge is shown in position in a recording and/or reproducing machine, hereinafter referred to as a tape recorder. The tape recorder comprises a support frame including a horizontal cartridge support deck 17 supporting a magnetic head 18 and, in a depending manner, supporting a reversible drive motor 20, the shaft of which extends through and carries a drive roller 21 above the support deck 17. Elongate guides 23 and 24 define the position for the cartridge on the cartridge support deck 17.

The cartridge shell 10 is formed with an opening 26 in its top wall and extending into one edge wall centrally of the length of the edge wall to provide access for the drive roller 21 of the tape recorder. The same edge wall of the cartridge shell is also formed with a cutaway portion 28 for access to the interior of the cartridge by the magnetic head 18. The cutaway portion 28 is normally covered by a door 29 which is pivoted on a stud 30 adjacent a corner of the cartridge and biased by a torsion spring toward its closed position covering the cutaway portion 28. The opposed edge walls 32 and 33 of the cartridge shell, which are perpendicular to the edge wall thereof containing the cutaway portion 28, are recessed along a majority of their length to expose the base wall, and the elongate guides 23 and 24 in the recorder are formed to fit over the exposed portion of the base wall of the cartridge shell to guide the cartridge as it is inserted into the recorder. The door 29 of the cartridge shell 10 extends beyond its pivot stud 30 into the recessed portion of the adjacent edge wall 32 and the leading edge of the corresponding cartridge guide 23 in the tape recorder is beveled to pivot the door 29 to an open position against the bias o the torsion spring as the cartridge is inserted into the machine.

The magnetic tape 15 is convolutely wound on the reel hubs 12 and 13 in opposite directions about their axes. The tape guide path between the reel hubs is defined by three guide pins 35, 36 and 37, one positioned at each side of the cutaway portion 28 of the cartridge shell 10 to guide the tape from the reel hub 12 and across the cutaway portion 28, and one pin positioned at the edge of the drive roller opening 26 farthest removed from the cutaway portion 28 to guide the tape to the reel hub 13.

A belt driving roller 39 is supported for free rotation by a shaft 40 extending from the base wall of the cartridge shell 10. The belt driving roller 39 is rotatable about an axis parallel to the axes of the reels 12 and 13 and it is positioned on the center line of the cartridge between the reel hubs. It is formed with a smaller diameter portion which has a central circumferential belt guide slot 41 in horizontal alignment with the center line of the tape guide path and a larger diameter portion 42 extending into the drive roller opening 26 in the cartridge shell 10. The larger diameter portion 42 of the belt driving roller 39 extends over the tape path between the guide pins 36 and 37 to permit driving of the belt driving roller 39 by the drive roller 21 in the tape recorder without contacting the tape 15.

A pair of belt guide rollers 44 and 45 are supported on the cartridge shell by stationary shafts 47 and 48, respectively, for rotation about axes parallel to the axis of the belt driving roller 39. The belt guide rollers 44 and 45 and their support shafts 47 and 48 are constructed of materials which have a predetermined coefficient of friction to provide a predetermined frictional coupling between each guide roller and its support shaft. The belt guide rollers are positioned at opposite corners of the cartridge shell 10 along the edge wall thereof parallel to the edge wall formed with the cutaway portion 28. Each belt guide roller is formed with a central circumferential belt guide slot in horizontal alignment with the guide slot 41 in the belt driving roller 39. The belt driving roller 39 and the belt guide rollers 44 and 45 define a belt guide path having an angle of wrap of at least 60° at the periphery of the reel hubs 12 and 13.

A thin, continuous, flexible and elastic belt 50 having a uniform cross-sectional area extends along the belt guide path around the belt driving roller 39 and the belt guide rollers 44 and 45 and contacts the tape 15 on the reel hubs 12 and 13. The belt 50 has a coefficient of elasticity in the range from 0.01 to 0.25 meters per newton meter. The length of the belt 50 is less than the length of the belt guide path so that when the belt is stretched into position along the guide path it will have an installed tension or pretension of at least 1.6 newtons.

Rotation of the belt driving roller 39 in the clockwise direction (as viewed in FIG. 1) by the drive roller 21 causes the belt 50 to traverse its guide path in a clockwise direction and the tape 15 to move from the reel hub 12 to the reel hub 13, the reel hub 12 serving as a supply reel and the reel hub 13 serving as a take-up reel. The predetermined frictional coupling between the belt guide rollers 44 and 45 and their respective support shafts 47 and 48 applies a predetermined drag to the belt as it passes around the guide rollers, thereby increasing the tension in the belt as it passes around each of the guide rollers. This increased tension in the belt 50 increases the length of the belt, according to the elasticity of the belt, thereby increasing the speed at which the belt passes around the take-up reel 13 over that at which it passes over the supply reel 12. This increased speed causes tension in the tape 15 as well as the ability to take up any slack developed in the tape between the reel hubs. Reversal of the direction of rotation of the belt driving roller 39 (i.e., counterclockwise as viewed in FIG. 1) will result in transfer of tape from reel hub 13 to reel hub 12 with the same tape drive properties.

As described in U.S. Pat. No. 3,861,619, the length of magnetic tape 15 is formed adjacent each of its ends with a first repetitive pattern of holes 53, 54, 55 and 57, 58, 59, respectively. The pattern of holes adjacent one end comprises a single hole 53, 54 or 55, the pattern being repeated three times. The pattern of holes adjacent the other end of the tape comprises two holes 57, 58 or 59 aligned across the width of the tape, the pattern being repeated three times. Each unit within the first pattern of holes may be termed a "cell" of information. For example, the set of two holes 57 within the first pattern 57, 58, 59 comprises a cell within the first pattern of holes. The differences in the cells, i.e., single holes and double holes, distinguishes the ends of tape from each other.

The length of magnetic tape 15 is also formed with two additional sets of holes 61 and 63 more centrally of the length of tape and distinguishable from the repetitive patterns 53, 54, 55 and 57, 58, 59. One additional set of holes 61 or 63 is associated with each end of the length of tape, the additional sets of holes together demarking the approximate ends of the desired recording area on the length of magnetic tape 15. In the illustrated embodiment each additional set of holes comprises a single hole 61 or 63, the two holes 61 or 63 being on the same level across the width of the magnetic tape 15 between two predetermined longitudinal recording tracks on the tape. The additional sets of holes 61 and 63 are distinguishable from the single holes 53, 54, 55 at one end of the tape by being on a different level across the width of magnetic tape 15 and they are distinguishable from the patterns of holes 57, 58, 59 at the other end of the tape by being single holes rather than pairs. The additional holes 61 and 63 are also smaller than the holes of the repetitive patterns 53, 54, 55 and 57, 58, 59 to eliminate any possibility of their interfering with the adjacent recording tracks.

A mirror 65 is supported by the cartridge shell 10 at a 45° angle to the tape path along the front edge wall of the cartridge to reflect light from a lamp 67 in the tape recorder against the rear face of the magnetic tape 15. A pair of vertically aligned photocells 69 and 70 are positioned adjacent the cartridge position to collect light reflected by the mirror 65 and transmitted through the holes in the magnetic tape 15. The upper photocell 69 is horizontally aligned with the upper course of holes through the magnetic tape 15 and the lower photocell 70 is aligned with the lower course of holes. The photocells 69 and 70 are electrically connected to a logic circuit which is illustrated schematically in FIG. 2 by the box 72.

The logic circuit 72 provides control of the drive motor 20 and recording by the magnetic head 18. When the cartridge is inserted into the tape recorder and the tape recorder is activated, the logic circuit 72 activates the drive motor 20 to search for an end of the magnetic tape 15. For example, suppose that the hole 61 is initially adjacent the mirror 65 and the drive motor is activated to transport the magnetic tape 15 from reel 12 to reel 13. In this case the transport would continue until the hole 53 passed between the mirror 65 and the photocell 70 indicating that the left end of the tape (as viewed in FIG. 4) had been found. The logic circuit would then cause the power to be removed from the drive motor 20. Now if the cartridge is removed from the machine and reinserted, the drive motor 20 may be activated in the same direction and this time sensing of hole 54 by the photocell 70 would tell the logic circuit that the left end of the length of magnetic tape 15 was present and the power to the drive motor 20 would again be removed.

Activation of the tape recorder in the recording mode will now cause the logic circuit 72 to control the drive motor 20 to drive in the opposite direction transferring tape from reel 13 to reel 12. Tape is transported without recording until the hole 61 passes between the mirror 65 and the photocell 69 at which time the logic circuit 72 is told that the beginning of the recording area has been reached. The logic circuit 72 then enables the magnetic head 18 to permit recording on the length of magnetic tape 15. Recording may then be continued until the hole 63 passes between the mirror 65 and the photocell 69, at which time the logic circuit 72 is told that the end of the tape is approaching and recording must soon be discontinued. When the first pattern of holes 57 at the end of the tape passes between the mirror 65 and the photocells 69 and 70 the photocells indicate to the logic circuit that the right end of the tape has been reached and the power is removed from the drive motor 20.

Now, again, if the cartridge is removed from the tape recorder and reinserted the patterns of holes 58 and 59 at the right end of the length of magnetic tape protect the tape from being pulled from the reel hub 13 if the drive motor 20 is activated in the same direction. With the cartridge in this condition, the magnetic tape being substantially transferred to the reel 12, the right end of the tape may serve as the beginning for a second recording track on the length of magnetic tape 15. For this reason the holes 61 and 63 are formed on the same level across the width of the tape and are spaced the same distance from the adjacent patterns of holes 53 and 57, respectively. Thus, when the tape is being transferred from reel 13 to reel 12 hole 61 serves as the load point to determine the beginning of recording and hole 63 serves as the early warning point to signal that recording should soon be ended, while when the tape is moved from reel 12 to reel 13 hole 63 serves as the load point and hole 61 serves as the early warning point.

According to the present invention, and as illustrated in FIG. 4, the length of tape 15 is modified by the addition of a second pattern of holes 74 within the first pattern of holes 57, 58, 59 at one end, and a second pattern of holes 76 within the first pattern of holes 53, 54, 55 at the other end. The second pattern of holes 74 and 76 consist of a succession of cells equally spaced along the tape 15 to provide a binary code in which "1"s and "0"s are indicated by the presence or absence of a hole or holes in the second pattern 74 or 76. As previously defined, a cell is one or more associated holes positioned along the length of the tape 15. The binary data imparted by the second pattern of holes 74, 76 may be utilized by the logic circuit 72 to automatically identify such things as the cartridge type or tape type.

Figure 5:
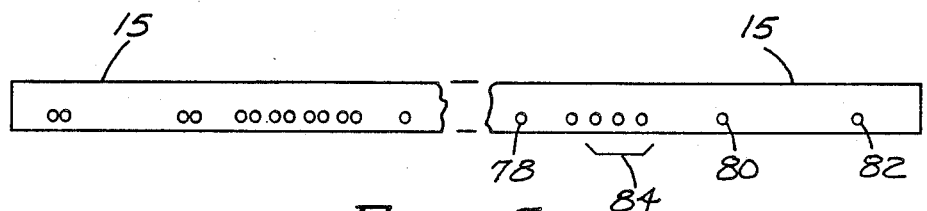
FIG. 5 is an elevational view of a second embodiment of a length of magnetic tape which may be contained within the cartridge of FIG. 1.

The second pattern of holes 74, 76 is differentiated from the first pattern of holes 57, 58, 59 and 53, 54, 55 by the spacing of the cells, wherein the spacing of the cells comprising the second pattern of holes is significantly shorter than the spacing between the cells of the first patterns of holes 57, 58, 59 and 53, 54, 55. The spacing between cells need not be equal as shown in FIGS. 4 and 5, but it must be shorter than the spacing of the first pattern of holes. It is noted that although four cells are indicated in FIG. 4 as comprising the second pattern of holes 74 or 76, there is no particular significance attached to this number. The number of cells may be fewer or greater, depending upon the amount of information it is necessary to impart to the logic circuit 72. It is also to be noted that either the presence or absence of holes at a cell location within the second pattern of holes can be interpreted by the logic circuit 72 as a "1" or a "0" to impart binary information to the logic circuit 72.

Operation of the drive as controlled by the logic circuit 72 is also modified according to the present invention as follows. When the tape is wound so as to cause the photocells 69 and/or 70 to encounter one of the cells of the first pattern of holes 57, 58, 59 or 53, 54, 55, the drive direction of the tape 15 is reversed until one of the additional sets of holes 61 or 63 is encountered. The drive direction of the tape 15 is then once again reversed toward the associated second set of holes 74 or 76. Passage of the second set of holes 74 or 76 before the photocells 69 and/or 70 imparts binary data to the logic circuit 72 to provide the information necessary for the automatic identification of such things as cartridge type or tape type. As noted above, the second pattern of hole 74 or 76 is identified by the logic circuit 72 by the different spacing of the second pattern of holes 74 or 76 from the first pattern of holes 57, 58, 59 or 53, 54, 55, respectively.

As shown in FIG. 4, it is preferred that the individual cells of the second pattern of holes 74 or 76 be identical to the associated first pattern of holes 57, 58, 59 or 53, 54, 55 within which the second pattern of holes 74 or 76 is located. The reason for this identity between the individual cells of the first pattern of holes 57, 58, 59 and 53, 54, 55 and the second pattern of holes 74 and 76 is so that the second pattern of holes 74 and 76 may perform the dual function of providing the binary data necessary for identification and providing the end-of-tape function normally attributed to the first pattern of holes 57, 58, 59 and 53, 54, 55.

For example, if the tape 15 were positioned with respect to the photocells 69 and 70 such that the photocells 69 and 70 were located between the first cell 57 of the first pattern of holes 57, 58, 59 and the first cell of the second pattern of holes 74, and wound toward the holes 59 of the first pattern of holes 57, 58, 59, the logic circuit 72 would first encounter the first cell of the second pattern of holes 74. Since the first cell of the second pattern of holes 74 is identical to the cells of the first patten of holes 57, 58, 59, the first cell of the second pattern of holes 74 would be interpreted as one of the cells of the first pattern of holes 57, 58, 59 and the tape drive direction reversed until the additional hole 63 was encountered. Then, as described above, the tape 15 would be wound toward and through the second pattern of holes 74 to provide the necessary binary identification information. In this instance, therefore, the first cell of the second pattern of holes 74 functions as both an end-of-tape marker and also the first binary item of information imparted to the logic circuit 72. To allow the second pattern of holes 74 to provide this dual function, it is preferred that the individual cells of the second pattern of holes 74 match the individual cells of the first pattern of holes 57, 58, 59. The preferred identity of cells between the first pattern of holes 57, 58, 59 and the second pattern of holes 74 is desirable because it speeds initiation of the necessary reversal and reversal again of the tape 15 to read the information contained in the second pattern of holes 74.

It is possible, however, that the second pattern of holes 74 or 76 need not contain cells which match the cells comprising the first pattern of holes 57, 58 and 59. In this case, if the tape 15 were positioned as described above, the tape would simply travel through the second pattern of holes 74 until the cell 58 of the first pattern of holes 57, 58, 59 was reached.

FIG. 5 illustrates that the individual cells of the various patterns of holes may vary considerably and still achieve the desired end. The tape 15 of FIG. 5 is provided with a first pattern of holes 78, 80 and 82 at one end wherein each individual cell is simply a single hole. The second pattern of holes 84 associated with this end of the tape 15 likewise has individual cells which merely consists of a single hole. The remaining end of the tape 15, however includes cells which consist of two closly spaced holes separated by a relatively greater distance. In any of the patterns illustrated in FIGS. 4 or 5, it is noted that the first pattern of holes associated with one end of the tape 15 is different from the first pattern of holes associated with the remaining end of the tape 15 so that the ends of the tape may be differentiated from each other. It also should be noted that the individual cells of the second pattern of holes in any example preferably are identical to the individual cells of the associated first pattern of holes for the reasons discussed above.

Figure 6:
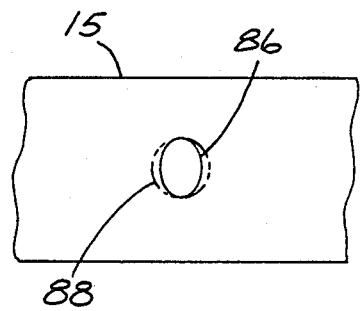
FIG. 6 is an elevational view of a portion of the length of magnetic tape contained within the cartridge of FIG. 1.

FIG. 6 illustrates a modification to the foregoing pattern holes which results in improved reliability of reading each individual hole. It has been observed that the punching of holes in the tape 15 results in localized stress concentrations and consequential distortion of the tape 15 which causes the circular shape of the hole to become distorted. As shown in FIG. 6, this distortion of the holes is compensated for by punching the holes in the shape of an ellipse 86 (shown in solid lines) which has its major axis aligned perpendicular to the length of the tape 15. Upon stretching of the tape 15 during use, the elliptical shape 86 is distorted to a circular shape 88 (shown in phantom lines) which is most desirable from a standpoint of reliable reading by the photocells 69 and/or 70.

We claim:

1. A magnetic tape cartridge comprising:
    a cartridge shell defining an enclosure;
    a pair of reel hubs supported within said enclosure;
    a length of magnetic tape extending along a tape path within said enclosure and having its end wound one on each of said reel hubs;
    said length of tape being formed at each end with a first pattern of holes to enable automatic identification of said end of said tape and defined by a succession of cells each consisting of one hole at one end of said tape and a succession of cells each consisting of two or more closely associated holes arranged across the width of said tape on a line perpendicular to the length of said tape at the other end of said tape; and
    a second pattern of holes located between two of said successive cells of said first pattern of holes and configured to provide a code to enable automatic identification of the cartridge type or tape type.

2. A cartridge according to claim 1 wherein said second pattern of holes consists of successive cells of holes configured identically to said cells of said first pattern of holes within which said second pattern of holes is located.

3. A cartridge according to claim 1 wherein said holes of said first and said second patterns are ellipses with the major axis of each hole oriented perpendicular to the length of said tape.

* * * * *